Patented Oct. 21, 1952

2,614,933

UNITED STATES PATENT OFFICE 2,614,933

SEPARATION OF PEAR WASTE INTO ITS LIQUID AND SOLID COMPONENTS

Robert P. Graham, El Cerrito, John H. Thompson, Burlingame, and Allan D. Shepherd, El Cerrito, Calif., assignors to the United States of America as represented by the Secretary of Agriculture No Drawing. Application March 6, 1951,
Serial No. 214,192

4 Claims. (Cl. 99—2)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the utilization of pear waste. In particular, it relates to methods for treating raw pear waste whereby this material can be separated into useful fractions. Thus the invention contemplates separating the waste into a solid fraction and a juice fraction. The solid fraction contains minerals and carbohydrates and can be dried and used as an animal feed. The juice fraction is a clear, straw yellow to amber solution containing sugars in such amounts that it can be used for many purposes. For example, the juice fraction can be used as a nutrient medium for the culture of yeast or other microorganisms. Further, it can be concentrated by evaporation to produce a molasses which can be used in animal feeds, human foods, or which can be utilized for preparing microbiological culture media. The molasses produced in this manner has a higher ratio of sugar to total solids than does beet or cane molasses and hence is a valuable carbohydrate source.

Thus an object of this invention is to provide methods whereby useful products can be recovered from pear waste. Another object is to provide methods whereby the pear waste can be treated to alter its chemical and physical nature so that it can efficiently be separated into its solid and juice fractions as by filtration or pressing. Another object is to provide methods for preparing a clear, sugar-containing juice from the waste, said juice being free from undesirable pectinous or other colloidal substances whereby it may be concentrated to a molasses without solidifying or gelling. A further object is to provide methods whereby to recover from the waste a solid fraction which can be dried readily and efficiently to produce a material useful as a stock feed or for other purposes.

Pear waste is a material produced in enormous tonnages at pear canning plants and usually consists of pear peels, seeds, cores, trimmings, overripe, and cull fruit. In pear canning operations, the amount of waste is from 40% to 45% of the pear used. The disposal of this waste constitutes a serious problem. This problem is especially acute in areas where local and State authorities forbid dumping the waste directly into streams and where facilities for sewage disposal are not adequate to handle the waste. In such cases the waste must be hauled from the factory to a dumping ground, at considerable cost to the processor. By applying the principles of this invention, this waste can be converted into valuable materials. Utilization of the waste would furthermore reduce health hazards resulting from dumping of the waste.

Many attempts have been made in the past to utilize pear waste, particularly to separate it into its solid and juice fractions. Such attempts have all been unsuccessful. The difficulty is that pear waste is a slimy mass containing fine particles of cellular material. When filtration or pressing is attempted to separate the juice from the solids, the fine particles of cellular material clog the pores of the filter or press cloth so that little or no passage of liquid can take place. If any juice is obtained, it still contains so much suspended matter that if it is evaporated sufficiently to be self-preserving, it will solidify in the evaporator. Further, the filter or press cake obtained thereby still contains so much water that if it is introduced into a dryer such as a rotary kiln dryer, it forms a taffy-like mass which sticks to the walls of the dryer or forms lumps or balls which do not dry properly. If the pear waste is finely ground and subjected to filtration or pressing, much of the waste will pass through the filter or press cloth and little separation will be achieved.

Various methods have been advocated for separating the juice and solid fractions of fruit pulps. These processes involve a lime treatment or a treatment using both lime and phosphoric acid (or other polybasic acid). These methods are based on the addition of an excess of lime to the waste to cause formation of calcium salts with the organic acids in the fruit material. The formed calcium salts then precipitate occluding with them various other solid materials such as fruit pulp, fiber and so forth. In many cases, particularly where the fruit pulp is deficient in organic acids, phosphoric acid or other polybasic mineral acid is also added. The resulting precipitate of calcium phosphate then assists in the separation as it occludes solid material as it comes out of solution. With some fruit wastes these methods have proved satisfactory. However in the case of pear waste, the known methods do not give successful results—the separation is inefficient because the material still tends to blind the filter or press cloths and the juice obtained is contaminated with pectinous materials which cause difficulties when the juice is evaporated.

The process of this invention involves, basically, a two-stage liming of the pear waste. In the first stage, which is similar to previously used liming treatments, sufficient lime is added to the waste to raise its pH to a level which activates the enzyme content of the waste whereby the pectin in the waste is largely de-esterified forming low-methoxyl pectins and/or pectic acid. These de-esterified products gel as they are formed due to the presence of the calcium ions and occlude the finely-divided particles suspended in the waste. While this action results in a modification of the character of the waste which makes possible separation thereof into its solid and juice components, we have found that the product produced at this point can be further altered to make it more capable of separation, that is, the rate of filtration and porosity of the material is greatly increased. To this end the treated waste is mixed with an additional amount of lime whereby certain chemical and/or physical changes take place whereby the mass becomes much easier to separate into its solid and liquid fractions. This second liming gives a result not yielded by the prior art process involving only a single stage of liming and constitutes the principal element of invention in our process. As shown in more detail in the examples, the application of the additional increment of lime results in a two- to three-fold increase in filtration rate as compared to the material to which no additional lime has been added.

In applying our novel process in practice, the following sequence of operations is carried out:

The raw pear waste is first ground or otherwise comminuted to permit thorough contact with the added reagents. The disintegration may be accomplished in any of the usual devices such as a hammer mill or brush mill.

After being comminuted, the waste is mixed with lime to activate the pectin de-esterifying enzymes and to promote formation of a gel with the resulting de-esterified products. Sufficient lime should be added to establish a pH from about 6 to about 9, this range providing the proper environment for the enzyme reaction. In general, the enzymic reaction is fastest at the upper end of this pH range. Usually we prefer to employ a pH of about 8.5 which gives rapid enzymic reaction and yet minimizes danger of localized over-liming during mixing and also maintains the pH above 6 as the lime is consumed in the reaction. The lime may be added to the pear waste in powder form and thoroughly mixed therewith. Usually, however, we prefer to apply the lime in the form of an aqueous slurry in which condition the lime can be readily measured out and rapidly incorporated in the waste. Although lime is the preferred calcium source from an efficiency and economy standpoint, one can use other compounds or mixtures equivalent thereto such as a mixture of a calcium salt like calcium chloride plus sufficient alkali such as sodium hydroxide to cause establishment of the proper alkaline pH in the waste. In any case the lime or other calcium source should be thoroughly incorporated in the waste by agitation of the mixture. It is preferred to use a slow agitator to avoid breaking up the pulp cells and pulp cell aggregates whereby separation of the solid and liquid components would become more difficult.

Another factor to be taken into account is the temperature of the lime treatment. Since the de-esterification is accomplished enzymatically, the rate of de-esterification and subsequent gel formation is markedly affected by temperature. In general, the temperature should be maintained in the range from about 60° F. to about 120° F., the reaction being accelerated at the higher temperatures within this range.

After the lime has been added to the waste the mixture must be allowed to react for the proper period of time, that is, sufficient time for the de-esterification and subsequent gel formation to take place. The time for reaction in any particular instance will depend on the type, condition and prior treatment of the waste, the concentration of calcium, pH, and temperature. Thus after incorporating the lime into the waste the mass is continuously stirred at a slow rate while observing the physical state of the mass. As the reaction proceeds, it will be noted that large sections of the mass will set up into gels which are subsequently broken up into small chunks of gelled material by the action of the agitator. When no further development of gelled areas is observed, the reaction is complete. In most cases this takes from 10 minutes to one hour, usually a half hour.

The reaction mass is then heated to break up the gel formations by favoring syneresis of the gel. This heating can be accomplished most readily by simply introducing steam directly into the batch while stirring it. The resulting dilution of the mixture by the condensed steam does not have any harmful effect. If desired, the mixing vessel may be equipped with steam coils or other heating means. In any case the mass should be brought up to a temperature from about 150° F. to about 180° F. It has been found that temperatures at the lower end of this range are particularly suited where the waste is derived from ripe fruit, while temperatures at the upper end of the range are more suited to cases where the waste is derived from green fruit.

Into the heated mass is now incorporated a further increment of lime. The amount of lime to be added will vary depending on several factors such as the type of pear waste, the pH used in the enzymic process, the amount of pectinous material in the waste, and so forth. The optimum amount of lime to be used in any particular instance can be determined by withdrawing samples from the batch, adding a different quantity of lime to each sample, and noting the filtration properties of each. From the resulting information one would then treat the entire batch with the concentration of lime which was found to give the most efficient separation, i. e., maximum porosity of filter cake or press cake and rate of filtration or pressing. In most cases, the proper amount of lime to be added will be in the range from about 1 to about 4 times the amount of lime added in the initial lime treatment. After mixing the requisite amount of lime with the hot waste, the mass is then, preferably while still hot, subjected to the separation treatment. For this purpose one may use a rack and cloth press, a bag press or other conventional pressing device. We prefer however to conduct the separation with the device described in the patent application of Robert P. Graham, John H. Thompson, and Amon H. Brown, entitled Device for De-juicing Fruit Pulps, Serial No. 209,672, filed February 6, 1951. This device comprises two rotating filter drums and a vessel positioned on top of the drums. The treated waste is pumped into the vessel whereby filter cakes are formed on the drum surfaces. As the drums rotate, the separate filter cakes are merged and squeezed between the drums. The device thus accomplishes a preliminary filtering or thickening of the waste followed by a pressing action and achieves a very efficient separation of the treated waste into a high solids content cake and a clear juice.

The chemical and physical changes on which our invention is based can be explained as follows: The initial limiting operation involves an enzymatic reaction. Thus the pear waste naturally contains pectin and pectin de-esterifying enzymes. By addition of lime to increase the pH of the waste and by suitable control of temperature, the environment conditions are made conducive to enzymic action. Under these conditions the enzymes are activated and the pectin is thereby converted into low-methoxyl pectins and/or pectic acid. These de-esterified products combine with the calcium ions in the waste to form gels which occlude the finely-divided material present in the waste plus some of the juice. Thus at this point the waste is a two-phase system—one phase being clear juice, the other phase being these particles of gelled pectinous material containing occluded solid material plus some juice. The mixture so produced is then heated, this heating operation having several significant results. In the first place the heating promotes syneresis of the gel, that is, the gel loses part of its juice content so that one then has a mass of gelled particles suspended in clear juice, the gelled particles containing a lesser proportion of juice than prior to the heating. The heating also inactivates the enzyme system so that further enzyme reaction is prevented. Further, the heating destroys a large part of the microbial population of the waste so that the final products will keep better. In the second liming operation, the gel particles are altered so that they take on the character of being true granular precipitates rather than insoluble gels. Thus during the first stage liming operation (the enzymatic process) the amount of calcium is necessarily limited to that required to obtain the proper conditions for the enzymatic changes to occur. When the pectinic acids and pectic acid are formed, sufficient calcium is present for these materials to gel. However, these compounds still possess free carboxyl groups because of the limited quantity of calcium which is present. By addition of more calcium ions in the second stage liming operation, more of the free carboxyl groups are salified with calcium ions whereupon the pectinic and pectic compounds become more insoluble and lose their gel-like character and are transformed into true precipitates. In effect, the gels are dehydrated. In this form the pectinates and pectates still occlude the finely-divided suspended material but hold less juice thus by the transformation, most of the fraction of juice formerly entrapped in the gel formations is released into the general juice phase in which the calcium pectinate or pectate precipitates containing occluded finely-divided material are suspended. At this point then the waste consists of a clear juice phase and particles of pectinous material occluding the finely-divided components of the waste. In this case the particles of pectinous material contain a very low proportion of juice, practically all the juice being in the clear juice phase. Under these conditions the waste becomes much easier to separate and exhibits an increased rate of filtration and an increased porosity of filter cake.

The following examples demonstrate our invention in greater detail. It is understood that these examples are furnished only by way of illustration and not limitation.

EXAMPLE I (A) Six thousand lbs. of raw cannery pear waste from Lake County, Calif., Bartlett pears, total solids 15.6%, was milled in a hammer mill using a ⅜" screen. To the milled waste was added 5.4 gallons of a 20% aqueous lime slurry (3 cc. lime slurry per 400 grams waste) to give a pH of 8.5. The lime was mixed into the waste with a slowly-driven agitator, the agitation being continued so as to break up the gel formed into small chunks. This mixing was continued for 30 minutes after the lime was added and then the mass was heated by direct injection of steam to 180° F.

(B) Four samples of this hot mixture were then taken. To three of these samples, additional amounts of lime slurry (2, 4, and 6 cc. of 20% lime slurry/400 g. waste) were added while maintaining the temperature at 180° F. All the samples, including the one to which no additional lime had been added (control) were then while still hot subjected to two separate filtration tests to determine porosity and filtration rate. In each case the filtrations were conducted with a laboratory suction filter of the Büchner type.

In the porosity test, a restricted size of sample was used (100 grams) and the time of filtration was restricted to 2 minutes. During this filtration the degree of vacuum attained in the filtrate chamber was measured as an index of the porosity of the mass, that is, the lower the vacuum the more porous the filter cake. The amount of juice which separated was measured as was the solids content of the filter cake.

In the filtration rate test, an excess of sample was used and the rate of de-juicing was measured at a constant vacuum of 10 inches of Hg in the filtrate chamber. The rate of de-juicing or filtration was determined by measuring the volume of filtrate produced at various intervals of time.

The results of these tests are given in the following tables:

Table 1.—Porosity tests

| Sample | Additional lime added, cc. of 20% slurry/400 g. sample | Vacuum attained in. Hg | Juice recovered, percent | Solids content of cake, percent |
|---|---|---|---|---|
| 1 | 0 | 25 | 49 | 18.7 |
| 2 | 2 | 11 | 55 | 20.8 |
| 3 | 4 | 5 | 58 | 21.2 |
| 4 | 6 | 8 | 58 | 21.8 |

Table 2.—Rate of filtration

| Sample | Additional lime added, cc. of 20% slurry/400 g. sample | Volume of juice separated, cc. | | |
|---|---|---|---|---|
| | | at 10 sec. | at 60 sec. | at 120 sec. |
| 1 | 0 | 21 | 38 | 48 |
| 2 | 2 | 23 | 47 | 61 |
| 3 | 4 | 29 | 59 | 77 |
| 4 | 6 | 32 | 60 | 75 |

From the data in Tables 1 and 2 it will be noted that the additional increments of lime resulted in a markedly lower vacuum (indicating a more porous cake), a higher juice recovery, a higher solids content in the cake, and a higher filtration rate as compared with the sample to which no additional lime was added.

(C) To the main body of the limed waste as prepared in part A was added 7.2 gallons of 20% lime slurry (4 cc. lime slurry per 400 g. waste). The slurry was thoroughly incorporated in the waste by means of agitation and the hot mass was then pumped into a double-drum pressure-type de-juicing device as disclosed in the aforesaid patent application of R. P. Graham, J. H. Thompson, and A. H. Brown. The solid fraction obtained had a solids content of 24.4% and could be dried directly in a rotary kiln drier without balling or gumming to produce a free-flowing granular product. The juice fraction obtained was clear and had a soluble solids content of 8.2%.

EXAMPLE II (A) Four thousand, seven hundred pounds of raw cannery pear waste from Santa Clara Valley (Calif.) pears, solids content 12.9%, was hammer milled using a ⅜" screen. To the milled waste was added 3.5 gallons of 20% lime slurry (2.5 cc. lime slurry/400 g. waste) to give a pH of 8.5. The lime was mixed into the waste with a slow agitator, the agitation being continued so as to break up the gel formed into small chunks. This mixing was continued for 30 minutes after the lime was added and then the mass was heated by direct steam injection to 180° F.

(B) Samples of material were treated with additional increments of lime and the separation characteristics of each sample determined as in Example I. The following results were obtained:

*Table 3.—Porosity tests*

| Sample | Additional lime added, cc. of 20% slurry/400 g. sample | Vacuum attained, in. Hg | Juice recovered, percent | Solids content of cake, percent |
|---|---|---|---|---|
| 5 | 0 | 17 | 46 | 16.9 |
| 6 | 2 | 14 | 55 | 18.6 |
| 7 | 4 | 12 | 61 | 20.2 |
| 8 | 6 | 12 | 60 | 20.8 |

*Table 4.—Rate of filtration*

| Sample | Additional lime added, cc. of 20% slurry/400 g. sample | Volume of juice separated, cc. | | |
|---|---|---|---|---|
| | | at 10 sec. | at 60 sec. | at 120 sec. |
| 5 | 0 | 10 | 22 | 29 |
| 6 | 2 | 24 | 40 | 49 |
| 7 | 4 | 26 | 47 | 59 |
| 8 | 6 | 32 | 60 | 76 |

(C) To the main body of the limed waste as prepared in part A was added 8.4 gallons of 20% lime slurry (6 cc. lime slurry per 400 g. waste). The slurry was thoroughly incorporated in the waste by means of agitation and the hot mass was pumped into the double-drum, pressure-type, de-juicing device as disclosed in the patent application of R. P. Graham, J. H. Thompson, and A. H. Brown. The solid fraction obtained had a solids content of 23% and could be dried directly in a rotary kiln drier without balling or gumming to produce a free-flowing granular product. The juice fraction obtained was clear and had a soluble solids content of 6.7%.

EXAMPLE III

A batch of 11,500 lbs. of raw pear waste was milled in a hammermill using a ⅜" screen. The milled waste was treated with 11.7 gallons of 20% lime slurry to give a pH of 8.5. After 30 minutes of slow stirring while keeping the mixture at a temperature of 90° F., the batch was heated to 150° F. by the direct injection of steam. Into the hot mixture was then incorporated 11.8 gallons of 20% lime slurry. The total batch, now 12,500 lbs., was dejuiced in the machine described in the aforesaid patent application of R. P. Graham, J. H. Thompson, and A. H. Brown. The average solids content of the pressed cake was 27.9% while the soluble solids content of the juice was 7.9%. The time required to separate the batch was 2¼ hrs. The corresponding average rates for the run were: Feed: total 12,500 lbs., rate 5600 lbs./hr.; juice: total 1040 gallons, rate 460 gallons/hr.; cake: total 3400 lbs., rate 1510 lbs./hr.

The pressed cake was dried directly for use as a cattle feed and the juice was concentrated to prepare a feed molasses.

Having thus described our invention, we claim:

1. In the process of separating pear waste into its solid and juice fractions wherein the waste is initially treated with lime at a pH from about 6 to about 9 and at a temperature from about 60° F. to about 120° F. whereby to cause enzymatic de-esterification of the pectin in the waste and subsequent gelation of the waste, the improvement which comprises heating the so-treated waste to a temperature from about 150° F. to about 180° F. in order to promote syneresis of the gelled waste, mixing with the heated waste an amount of lime from about 1 to about 4 times the quantity previously added and separating the mixture into its solid and juice fractions.

2. A process for separating raw pear waste into its solid and juice fractions which comprises mixing the pear waste with a first amount of lime in an amount sufficient to establish a pH from about 6 to about 9, allowing the mixture to react at a temperature from about 60° F. to about 120° F. until it gels, heating the mixture to a temperature from about 150° F. to about 180° F. to promote syneresis of the gel, adding to the mixture a second amount of lime in an amount sufficient to give the mixture optimum filtration characteristics as determined by porosity and rate of filtration tests on pilot samples of the mixture, then separating the juice from the solid components of the mixture.

3. A process for separating raw pear waste into its solid and juice fractions which comprises mixing the pear waste with a first amount of lime in an amount sufficient to establish a pH from about 6 to about 9, allowing the mixture to react at a temperature from about 60° F. to about 120° F. until it gels, heating the mixture to a temperature of from about 150° F. to about 180° F. to promote syneresis of the gel, adding to the mixture a second amount of lime in an amount from about 1 to about 4 times the amount added in the first instance, then separating the juice from the solid components of the mixture.

4. A process for separating raw pear waste into its solid and juice fractions which comprises mixing the pear waste with a first amount of lime in an amount sufficient to establish a pH of about 8.5, allowing the mixture to react at a temperature from about 60° F. to about 120° F. until it gels, heating the mixture to a temperature of from about 150° F. to about 180° F. to promote syneresis of the gel, adding to the mixture a second amount of lime in an amount from about 1 to about 4 times the amount added in the first instance, then separating the juice from the solid components of the mixture.

ROBERT P. GRAHAM.
     JOHN H. THOMPSON.
     ALLAN D. SHEPHERD.

REFERENCES CITED

The following references are of record in the file of this patent:

UNITED STATES PATENTS

| Number | Name | Date |
|---|---|---|
| 1,991,242 | Cole et al. | Feb. 12, 1935 |
| 2,536,240 | Vincent | Jan. 2, 1951 |
| 2,548,510 | Neal | Apr. 10, 1951 |